United States Patent
Bouldin et al.

[19]

[11] Patent Number: 5,860,372
[45] Date of Patent: Jan. 19, 1999

[54] SEEDLING TRANSPLANTER WITH PLANTING FINGERS

[75] Inventors: Floyd E. Bouldin; Stephen F. Springston, both of McMinnville, Tenn.

[73] Assignee: Bouldin & Lawson, Inc., McMinnville, Tenn.

[21] Appl. No.: 717,553

[22] Filed: Sep. 23, 1996

Related U.S. Application Data

[63] Continuation-in-part of Ser. No. 391,501, Feb. 21, 1995, Pat. No. 5,557,881.

[51] Int. Cl.$^6$ ..................................................... A01G 23/02
[52] U.S. Cl. .............................. 111/105; 111/104; 47/901
[58] Field of Search ................................ 47/1.01 R, 901; 111/100, 102, 104, 105

[56] References Cited

U.S. PATENT DOCUMENTS

| | | | |
|---|---|---|---|
| 4,750,439 | 6/1988 | de Goot | 111/105 |
| 4,947,579 | 8/1990 | Harrison et al. | 47/901 X |
| 5,121,955 | 6/1992 | Visser | 111/104 X |
| 5,160,235 | 11/1992 | Bikow | 111/105 X |
| 5,247,761 | 9/1993 | Miles et al. | 111/104 X |

OTHER PUBLICATIONS

Rapid Automated Systems, LLC Copy of Rapid Automated Systems, LLC, brochure titled "Rapid Transplanter" (no date).

Flier USA Copy of Flier USA, brochure titled "Automatic Transplanter Type 32" (1995).

Flier USA Copy of Flier USA, brochure titled "Auto Transplanter" (no date).

Blackmore Company Copy of Blackmore Company, brochure titled "The Harrison Robotic Transplanter from Blackmore . . . ".

Metroplanter USA Inc. Copy of Metroplanter USA Inc., brochure titled "Metroplanter USA Inc." (no date).

*Primary Examiner*—Michael J. Carone
*Assistant Examiner*—Robert Pezzuto
*Attorney, Agent, or Firm*—Rich R. Wascher

[57] ABSTRACT

An apparatus for transplanting seedling from a first ray to a second tray. The apparatus includes a frame, a moveable gantry connected to the frame, and a conveyor system. In the preferred embodiment, a first conveyor is used to shuttle seedlings into the operative reaches of the apparatus and a second conveyor shuttles the transplanted seedlings out of the operative reaches of the apparatus. The gantry includes a gripper assembly comprised of a plurality of grippers slidably mounted to a track. A positioning mechanism is employed to move the gantry and associated gripper assembly. The grippers includes an upright support and a pair of pivotally connected spaced apart gripper fingers. The gripper fingers are separated by a plunger mechanism preferably having a beveled surface for ease of insertion between the gripper fingers.

16 Claims, 15 Drawing Sheets

SEEDLING TRANSPLANTER WITH PLANTING FINGERS

This is a continuation in part of application Ser. No. 08/391,501, filed Feb. 21, 1995, now issued as U.S. Pat. No. 5,557,881 on Sep. 24, 1996.

BACKGROUND OF THE INVENTION

1. Field of the Invention

The present invention relates generally to machines used in the nursery industry for taking seedlings extracted from a first seedling tray or "plug tray" and transplanting them into yet another second growing tray generally having a greater area of separation between the newly transplanted seedlings than the first plug tray from which they were extracted in order to encourage continued unimpeded growth of each individual seedling.

2. Description of the Related Art

In the nursery industry, plants are initially germinated and grown in trays having an array of small compartments within the tray. These small compartments are sufficient to accommodate the plant in the early stages of its development from a single seed into a small seedling while economically making use of the limited space available within a greenhouse or other nursery building. Once the seedlings have germinated and have approached the maximum size desirable while remaining in the small germination compartments, each seedling must be transplanted to a larger tray or pot for further growth and eventual outdoor planting or commercial sale.

The roots of the seedlings will typically form a compact ball with the soil contained within the tray compartments, which allows the seedling and the associated soil to be transplanted as a unit (the seedling "plug"). In the past, seedlings have been transplanted by hand into pots or other trays with larger compartments that have been pre-filled with soil. Hand transplanting allows seedlings to be easily transplanted from seedling arrays of any configuration to single pots or, more commonly, arrays of pots contained within a unitizing flat. However, the high cost of labor and the seasonal nature of such transplanting work has made this method undesirable.

Automatic transplanters are known which utilize specially fabricated seedling flats which permit the seedlings to be pressed through the base of a germination compartment into a pot located below. Other known transplanters use cam-driven rotating pairs of plate-like fingers to extract the seedlings, or utilize pre-bent metallic wire fingers which are retained in a straight configuration and injected into the soil surrounding the seedling. These known devices move the germinating tray on an indexable table with respect to the transplanting head of the apparatus.

What is needed is an apparatus of sturdy construction which may readily accommodate germinating trays of varying compartmental array dimensions, and which will rapidly transplant seedlings to larger trays of other compartmental array configurations. The present invention relates to apparatuses and methods of transplanting young plants from seedling trays to larger trays.

In the art to which the invention relates, complicated systems have been developed to transplant plants from a seedling plug tray, where they have initially germinated, to a larger flat tray where they will have more room to grow. These systems have been unduly complicated, and have sometimes injured the seedlings. In the case of a begonia seedling for example, begonia leaves are broad and grow close to the surface of the soil from which the primary stem extends. The prior systems and machines have been known to damage these types of plants (e.g., begonias) when the seedling is extracted from the tray in which it germinates originally.

It would be desirable to develop a plant transplant apparatus and method which can quickly and accurately transplant plants from a seedling tray to a larger tray. Further, it would be desirable to develop such an apparatus and method which can transplant the plants without damaging the seedlings, and have it adaptable to various sizes and types of trays and plants.

SUMMARY OF THE INVENTION

The transplanter typically includes three basic components: (i) a frame, (ii) a gripper assembly and (iii) a conveyor system. The frame includes a pair of generally upright spaced apart side frame sections held in their upright position by a plurality of cross frame members. In addition to providing enhanced structural stability to the transplanter, the cross frame members serve a plurality of other functions, such as providing ample frame structure to mount the various components of the conveyor system and gripper assembly.

With respect to the conveyor system, a first feed or delivery conveyor is positioned perpendicular to a secondary transplant or shuttle conveyor. The feed or delivery conveyor is preferably chain, belt or gear driven. Both conveyors typically include a continuous belt component which overlies a platform component. Associated with the belt of the feed or delivery conveyor are a plurality of lateral separating members. The separating members are positioned perpendicularly across the belt, as compared to the direction of belt rotation, and typically advance at the same rate as the belt.

In this manner, a tray of seedlings to be transplanted can be placed adjacent to one another on the feed conveyor and be separated by a separating member. As the separating members advance in the direction of the travel of the conveyor belt, the trays of seedlings are shuttled along the belt into the operating reaches of the transplanter. Plug trays are, therefore, loaded at the proximal end or beginning of the feed conveyor and are advanced toward the distal end of the feed conveyor.

In order to facilitate the removal of a seedling plug from its plug tray, the transplanter includes a subassembly including a plurality of individual pins spaced apart but aligned in a single row. The pins reciprocate from between a lower position and a raised position. A perforated plate is placed adjacent to and in the path of the trays and following the belt of the feed or delivery conveyor.

When the pins are raised and lowered they travel through the aligned row of holes in the plate. As a plug tray is advanced along the belt by the separating bars, the tray is forced to overlie the perforations in the plate. The perforations in the plate generally correspond with the spaced apart relationship of the holes or apertures in the bottom of the seedling plug tray. In this fashion, as the transplanter of the present transplanter is operating, the row of pins moves from their lower position to their raised position, passing through the holes in the plate and the holes in the plug tray. As the pins pass through the holes in the seedling trays the pierce the root balls of a seedling and cause the seedling plugs to be removed and elevated above the tray while resting atop the pins.

When the seedling plugs are in the raised position, removed from the tray in which they began their germination, a gripper assembly moves into position from a lateral direction to grasp and take possession of the individual seedlings. The approach of the gripper assembly is believed to be particularly important because some seedlings have broad leafs with short stems, e.g., begonias. Lateral approach of the grippers allow the gripper fingers (described below) to push the leafy foliage aside and take possession of the seedling without damaging it. The Bouldin & Lawson gripper assembly are like none other in the industry. When the grippers have taken possession of the seedlings, the grippers move to a transplanting position and deposit the seedlings in trays resting on the delivery conveyor. The cycle is repeated until the feed tray is empty.

With respect to the gripper assembly, the actual grippers are operably mounted to a movable gantry. The individual grippers are preferably linked to one another by a flexible belt which, depending upon the slack in the belt between individual and adjacent grippers, determines the user selected spacing between the grippers during the transplantation process of the seedling plug into the delivery tray. Thus, the gantry is designed to move the individual grippers into and out of alignment of the seedling plug tray (feed tray) and the secondary tray (shuttle tray). The gantry, therefore, moves in a horizontal direction as well as in a vertical direction. Thus, the separation distance of the individual grippers as well as the number of grippers depends upon the number of grippers attached to the belt and gantry. In addition, the number of individual grippers contained in any one array will vary depending upon the number of compartments in a particular seedling plug tray row, or the transplanting application to be carried out.

The horizontal movements of the gantry are driven by pneumatic or hydraulic cylinders which are connected to the frame of the transplanter. In addition, the gantry further includes a geared track on which the individual belt-linked grippers may reciprocate in the vertical direction. The geared track is generally positioned at an inclined or declined angle (depending upon the frame of reference). When viewed from the rear and top of the transplanter, the geared track extends "away" and "downward" at a decline. Accordingly, the vertical movement is an isolated vertical movement but a component of the complex movement of the gantry.

The gantry further includes a plurality of cross tracks positioned in a substantially horizontal fashion with respect to the gantry and frame. Each gripper includes a connection bracket or means to enable the grippers to be sidably mounted to the track to which they are attached. The cross-tracks enable the plurality of belt-linked grippers to slide inwardly and outwardly from a vertical centerline of the gantry.

In the rest position, the belt linked grippers are in their contracted position, that is, they form a horizontal stack or group of grippers in a side by side fashion. In this arrangement, as the gantry is moved in a distal to proximal (lateral) direction by the pneumatic cylinders, the gripper fingers, as will be described hereinbelow, are allowed to surround the leaves of a particular seedling from the horizontal direction. As mentioned above, lateral movements of the grippers in the plane of the seedlings is preferred in order to prevent damage of the leaves of the seedling.

Each gripper has one or a pair of spaced apart, pivoting fingers. As the individual grippers are moved toward the seedlings by the gantry, the fingers are separated by a separating member in the nature of a plunger or air bladder mechanism to allow the seedling room to move therebetween. When the gantry and grippers reach their forwardmost position, the fingers are allowed to close around the seedlings and take possession of them. That is, as the gantry travels to its most proximal position and the gripper fingers have surrounded the seedling plugs, the gripper fingers close and the elevating pins drop to their lower positions.

Reverse actuation of the pneumatic cylinders draws the gantry in a rearward direction in predetermined alignment with an open row corresponding to the secondary conveyor and the transplanting trays resting thereon. Sensors are provided to detect the proper positioning of the grippers during the transplanting cycle. As the transplanting operations continue, the sensors detect the position of empty soiled filled compartments i.e., compartments without seedlings) of the delivery trays. When an open row is detected, the gantry is withdrawn and stopped such that the individual grippers are slightly offset from the desired row in which the seedlings will be planted.

When the gantry is moved to this transplanting position, down the declined track, the pairs of gripper fingers pierce the soil of the delivery trays. The angled fingers, or the angle of gripper presentation with respect to the tray, allow for insertion of the seedling at an angle and thus reduce inadvertent extraction of the transplanted seedling when the gripper fingers are withdrawn from the soil of the delivery trays after each successive cycle.

When the gripper fingers enter the soil, they automatically separate when the separating member is deactivated, i.e., reciprocating plunger is withdrawn from between the gripper fingers, or the air bladder is deflated or inflated depending upon the embodiment. As this occurs, a pulse or jet of water is ejected from a water supply line which is typically parallel with the long axis of each gripper. The water serves as a jet lance to insure the seedling is ejected from the space between the gripper fingers and also to rinse the tips of the gripper fingers and allow the soil of the seedling root ball to coalesce with the surrounding dirt of the transplanting tray.

After this operation is carried out, the grippers are removed as the geared gantry travels upward along the geared track. Thus, transplanting in this manner eliminates the need of pre-dibbling the trays prior to the introduction of the seedling. As the grippers are extracted in accordance with the travel of the gear along the geared track, they are drawn into communication with a plurality of plate-like cleaners. Given that successive of operations of the grippers might cause a buildup of soil and organic matter on the gripper fingers, optional plate-like cleaners may be provided to scrape debris and soil from the gripper fingers prior to the subsequent transplanting cycles.

The process continues until the sensor detects that all of the rows of the transplanter tray have been filled and the now filled transplanter trays are shuttled along the second or shuttle conveyor, which is perpendicular to the feed conveyor, and out of the working area of the transplanter of the present transplanter.

The present invention may be summarized in a variety of ways, one of which is the following: an automated apparatus for transplanting seedlings having a soil caked root plug from a seedling tray to another tray, comprising: a frame having a front, a back, and spaced apart side members; a conveyor system for shuttling seedling trays into and out of the apparatus; drive means for operating the conveyor system; a gantry moveable between the side members of the frame; the moveable gantry further includes at least one gripper configured to laterally grasp and take possession of a seedling removed from a seedling tray and plant it into the soil of another tray, wherein the at least one gripper includes at least two spaced apart finger elements which operate between an opened and a closed position; and each finger element has a proximal portion and a soil penetrating portion for insertion into the soil of a seedling tray at a downward angle in order to plant a seedling therein without the need for pre-dibbling of the soil, and further capable of being removed at an upward angle to minimize the possibility of extracting the previously transplanted seedling therefrom.

The preferred apparatus further includes a wetting apparatus for supplying liquid to the transplanted seedling in order to facilitate the coalescence and assimilation of the soil of the caked root plug and the soil of the tray in which the seedling was transplanted.

The preferred apparatus further includes a fluid supply line attached to the inlet of the supply tube and the outlet of the supply tube is positioned adjacent to the soil penetrating portion of the at least two finger elements enabling the liquid dispensed therefrom to impinge on the seedling being transplanted.

The preferred apparatus, wherein the conveyor system further includes: a first conveyor system and second conveyor system.

The preferred apparatus, wherein the at least one gripper further includes: a separating member configured to enable the at least one finger element to pivot from a first open position and a second position during operation of the apparatus. Each gripper of the gripper assembly further includes: connection means for sliding engagement with the gantry.

The preferred apparatus, wherein the gripper assembly further includes: a flexible belt attached to each gripper enabling the plurality of grippers to separate from one another a predetermined user selected spaced apart distance.

The preferred apparatus further including: separating means for separating the plurality of grippers the predetermined user selected distance and contract the separated plurality of grippers to a substantially side by side group thereof in an accordion like fashion; and, means for removing clinging soil and debris from the angled soil penetrating portion of the finger elements.

The preferred angle of the soil penetrating portion of the finger elements or its angle of presentation is selected to be between 45 and 75 degrees from the vertical.

The present invention may also be summarized as follows: an automated apparatus for transplanting seedlings from a first tray to a second tray, the apparatus having a frame, a conveyor system to shuttle the trays of seedlings, and an elevation mechanism to raise the seedlings to be transplanted from their tray to a position where a gripper may grasp and take possession of the seedling, wherein the gripper comprises: an upright support member, a plurality of spaced apart finger elements wherein at least one of the finger elements is pivotally connected with respect to another finger element; each finger element has a soil penetrating portion configured to enable a seedling to be transplanted into soil without the need for pre-dibbling the soil; and a separating member configured to enable the at least one finger element to pivot from a first open position and a second position during operation of the apparatus.

The preferred gripper, wherein the separating member is: an air bladder or a reciprocating plunger, and the separating member further partially comprises: air supply means for selectively inflating or deflating the air bladder.

The present invention may also be summarized as follows: a gripper configured for use with an automated seedling transplanting apparatus for transplanting seedlings from a first tray to a second tray and having an attachment mechanism for the gripper, wherein the gripper comprises: a support portion configured to enable the gripper to be attached to the attachment mechanism of the transplanting apparatus; at least two finger elements wherein at least one of the finger elements is pivotally connected to the support portion; each finger element has a soil penetrating portion configured to enable a seedling to be transplanted into a soil without the need for pre-dibbling of the soil; and a separating member configured to enable the at least one finger element to pivot from a first open position and a second position during operation of the apparatus.

It is an object of the present invention to provide an apparatus for transplanting seedlings from one tray to another without the need of pre-dibbling the tray in which the seedlings are transplanted.

It is an object of the present invention to provide an apparatus for transplanting seedlings from one tray to another while minimizing the damage to the foliage of the seedling.

It is an object of the present invention to provide an automatic transplanting apparatus having an angled set of grippers of the types described herein.

It is an object of the present invention to provide a transplanting apparatus with a gantry movable in the horizontal and vertical direction while transplanting.

It is an object of the present invention to provide a transplanting apparatus with a plurality of grippers having angled gripper fingers or presented into the transplanting tray at an angle of the type set forth and described herein.

DETAILED DESCRIPTION OF THE PREFERRED EMBODIMENT(S)

Figure 1A:
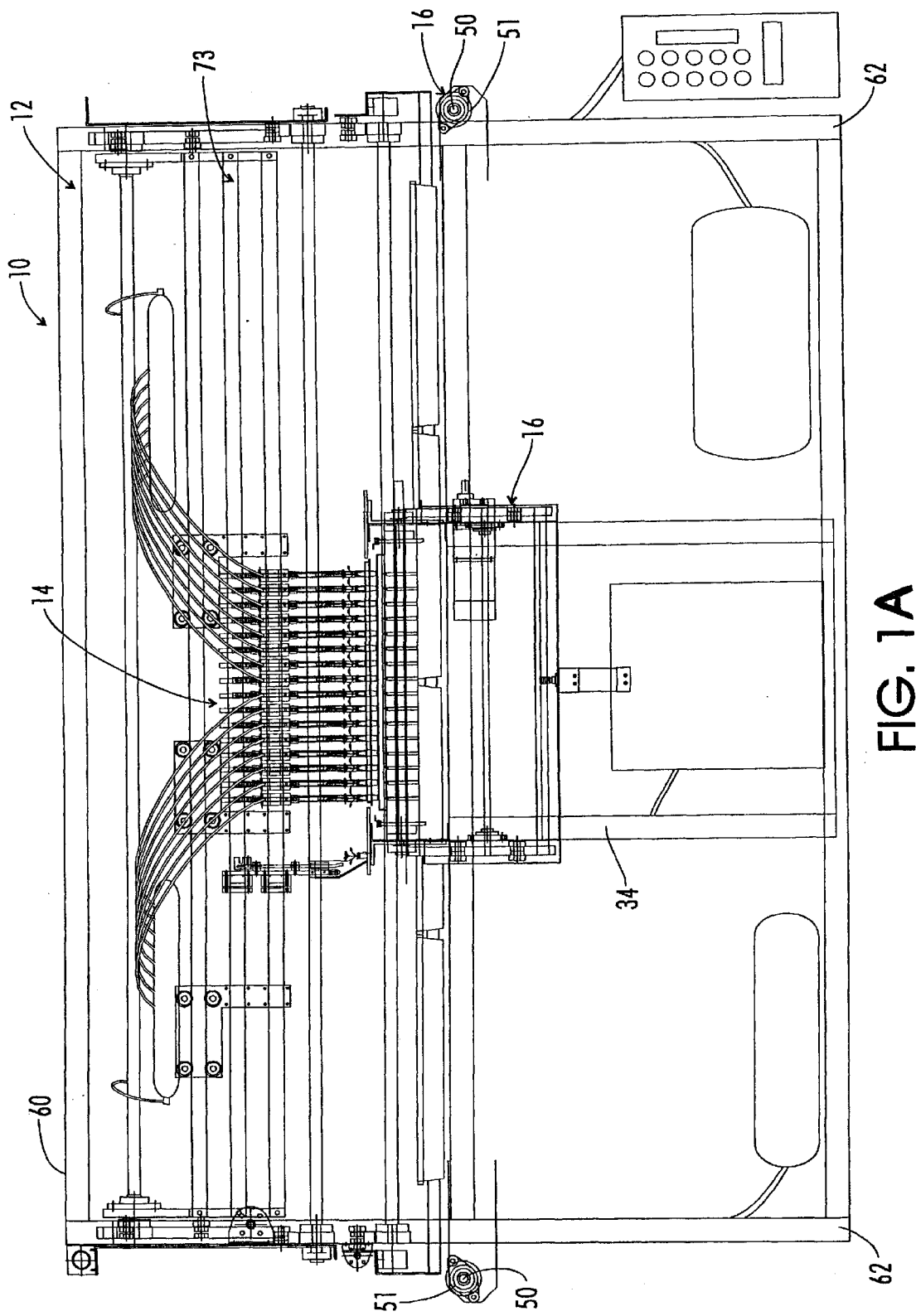
FIG. 1A is a front view of an embodiment of the apparatus of the present invention.
Figure 1B:
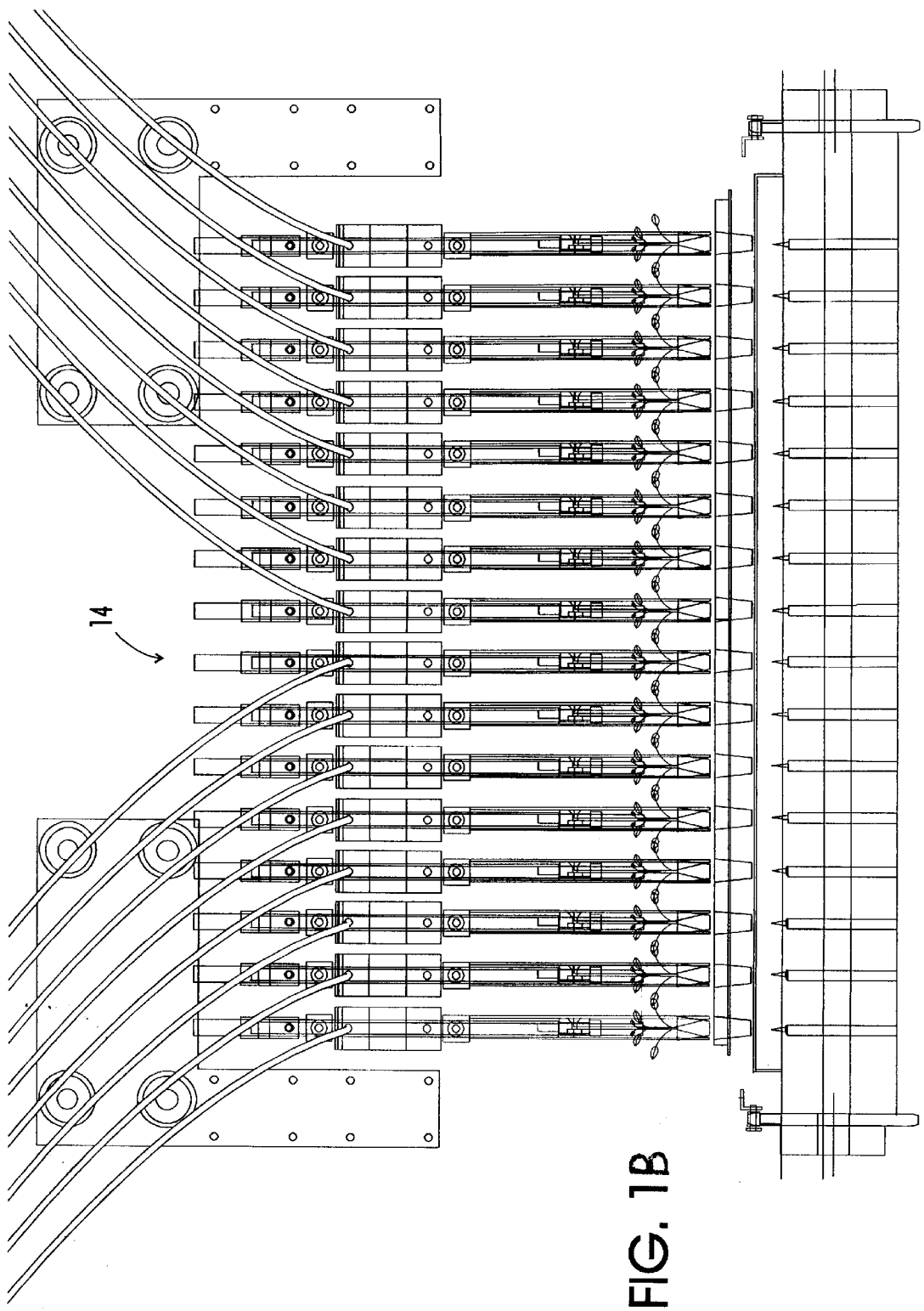
FIG. 1B is a front view of an embodiment of a gripper assembly of the present invention.
Figure 2:
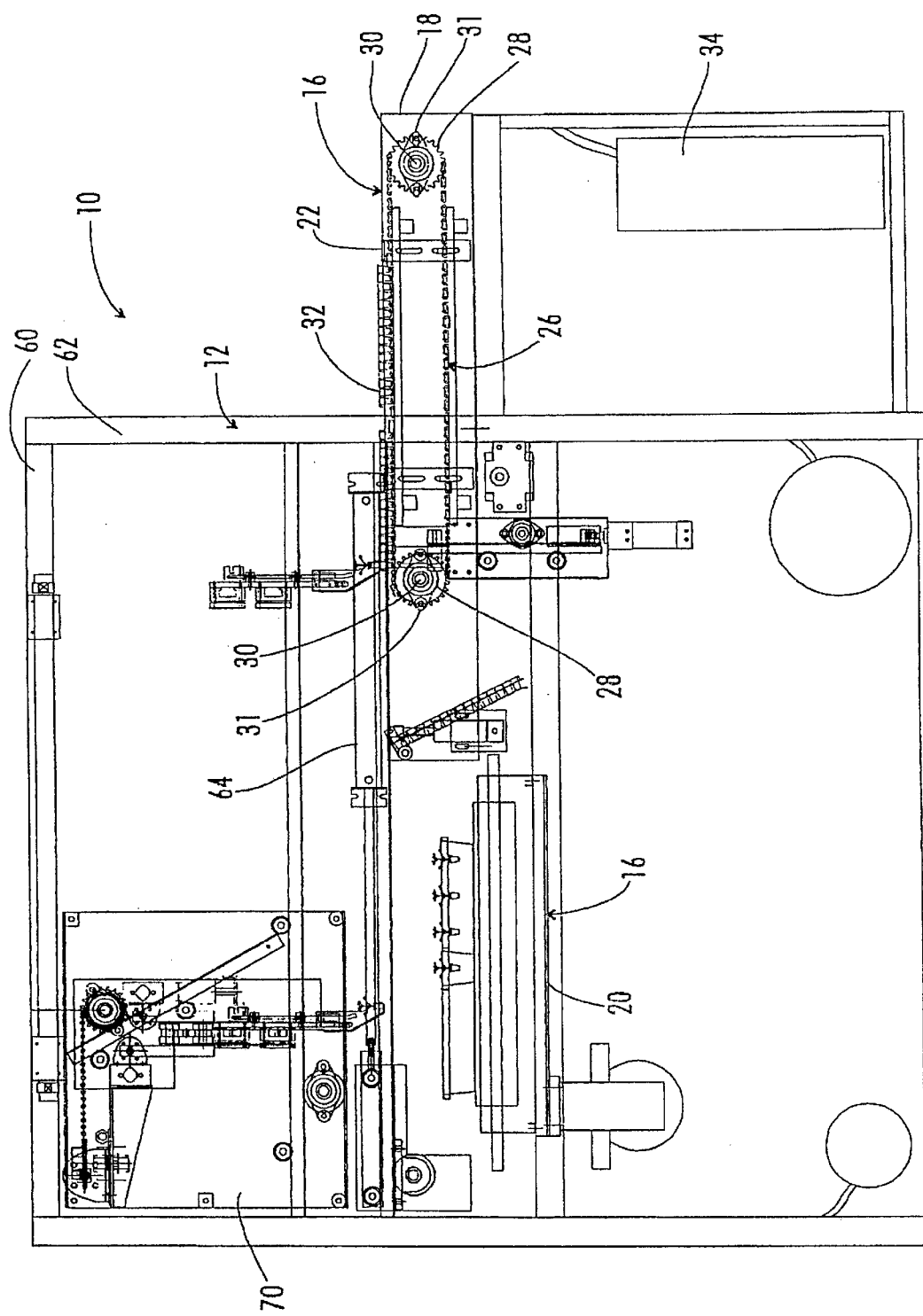
FIG. 2 is a left side view of the embodiment shown in FIG. 1 with certain components of the frame structure of the apparatus removed for better clarity of the elements shown in this Figure.

With reference to FIGS. 1A, 1B, 2, 8 and 9 a preferred embodiment of the present invention is designated generally by the reference numeral 10. The preferred embodiment 10 includes a frame assembly 12, a gripper assembly 14, and a conveyor system 16.

With reference to the conveyor system 16, a feed conveyor designated generally by the reference numeral 18 is shown in perpendicular relative alignment with a delivery conveyor system designated generally by the reference numeral 20. The feed conveyor system 18 includes a substantially continuous belt 22 having separator bars 24 (see FIGS. 8 and 9) spaced apart along the length of the belt 22. The separator bars are designed as a means of separation between adjacent trays 44 described below. The feed belt drive assembly is designated generally by the reference numeral 26 and includes a plurality of sprockets 28. Sprockets 28 are actually spaced apart pairs of sprockets only, one of which is shown from the view illustrated in FIG. 2. The spaced apart pairs of sprockets are connected by shafts 30 attached to a portion of the frame 12 by bearings 31. A drive chain 32 engages both pairs of spaced apart sprockets 28. Of course, it is contemplated that a single drive chain may be used but a dual drive chain system is preferred to prevent binding or the torsional effects experienced by the belt 22.

A drive source (not shown) is coupled to the drive shafts 30 and/or sprockets 28 to provide the motive force to turn the substantially continuous belt 22 in order to shuttle the trays 44 into and toward the operating reaches of the gripper assembly of the apparatus as discussed below in the mode of operation. Support 34, which actually partially comprises the frame 12, is provided as a means of elevation of the feed conveyor system 18 above the ground.

Figure 8:
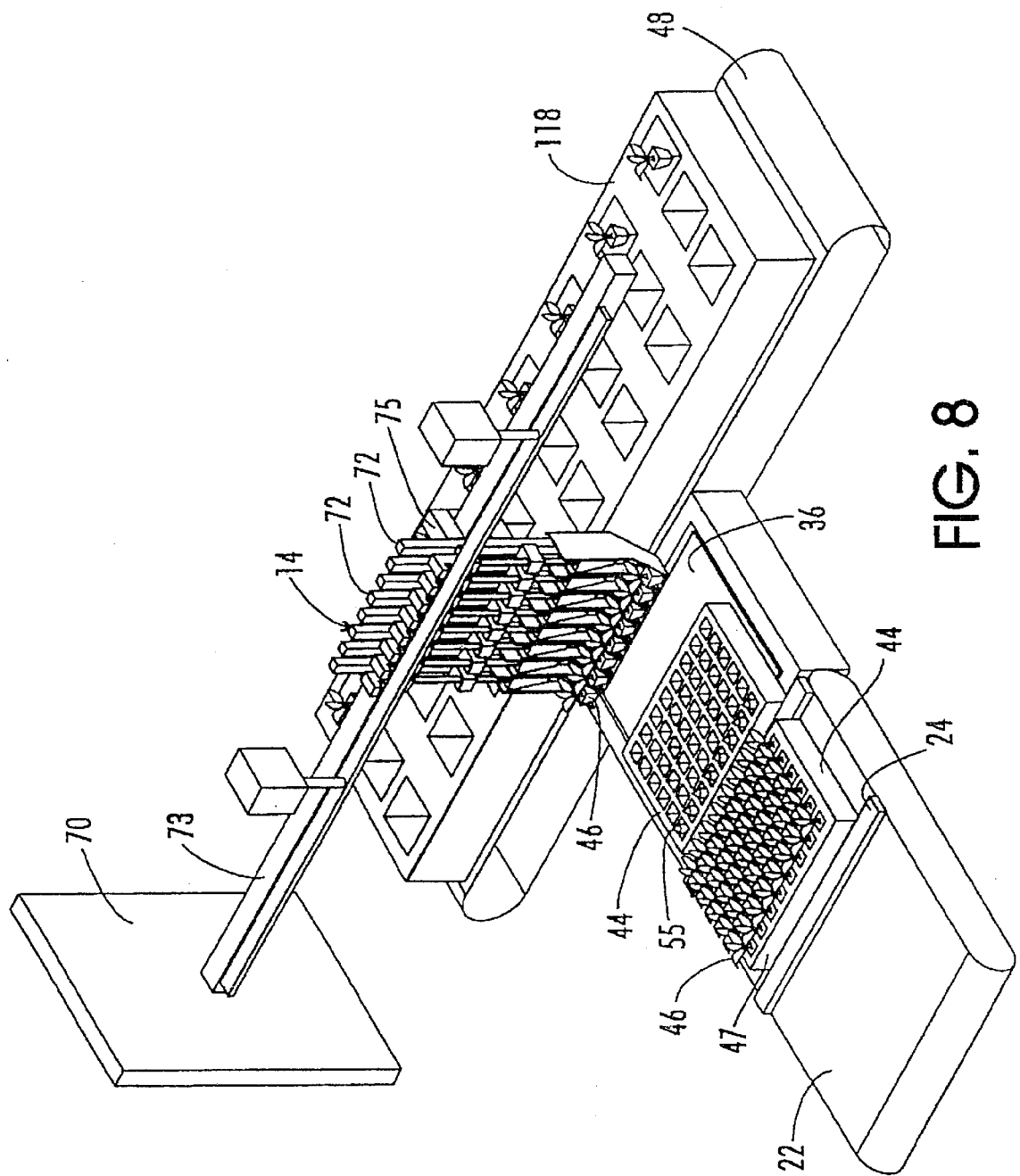
FIG. 8 is an elevated perspective representational view of the operative arrangement of various components of the present invention.
Figure 9:
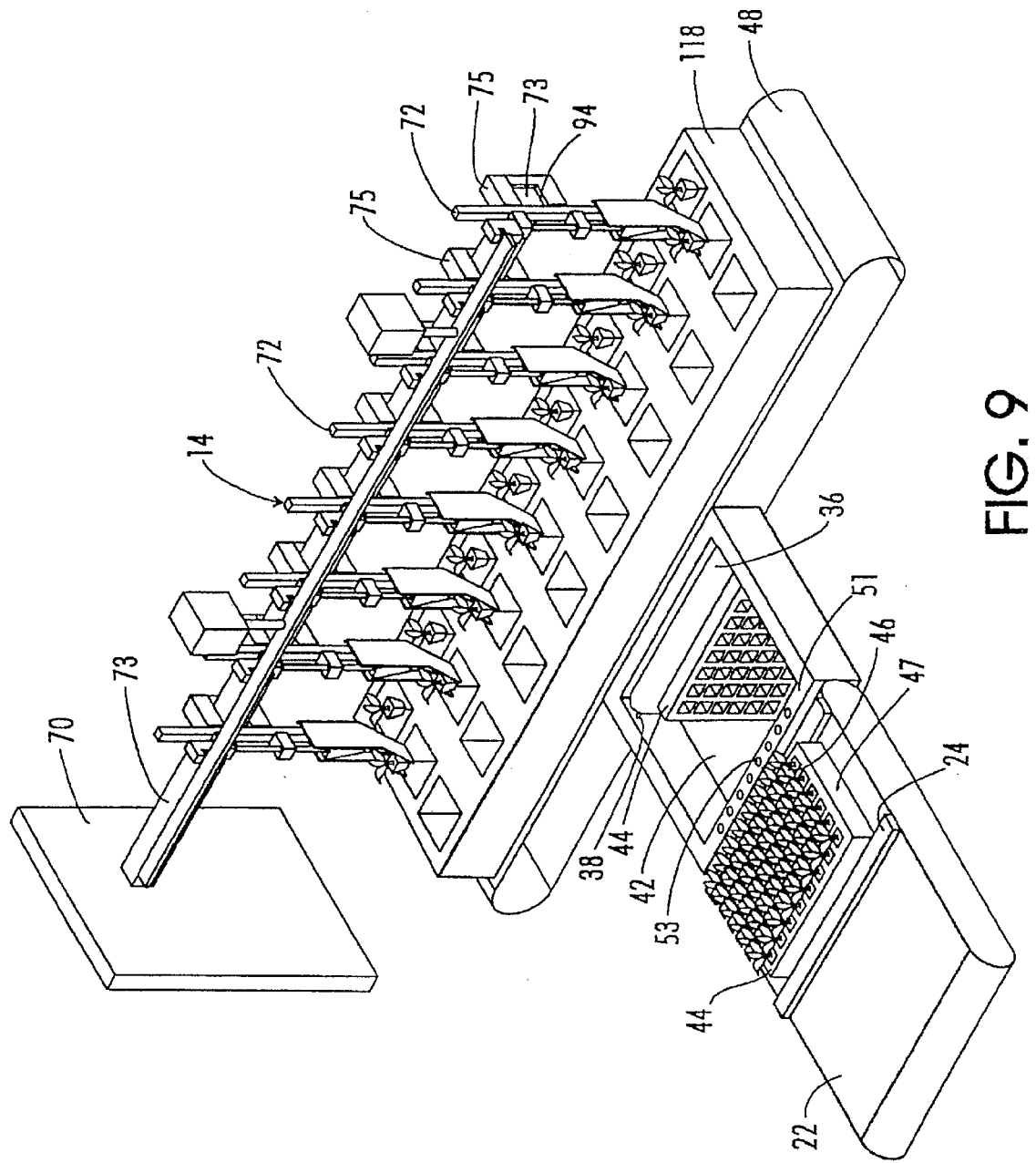
FIG. 9 is an elevated perspective representational view of the operative arrangement of various components of the present invention.

Optional door 36 (FIG. 8 and 9) serves as a trap door and, hence, includes a pivot 38 at its proximal end such that the planar door 36 may reciprocate from an open and closed position by an actuator (not shown). In the closed position, the opening designated generally by the reference numeral 42 of FIG. 9 is sealed off When open, space 42 allows a tray 44 to fall therethrough after the seedling plugs 46 have been extracted therefrom in the manner set forth in the mode of operation discussed below.

With reference to the delivery conveyor system 20, another substantially continuous belt 48 is used. Similarly, a pair of spaced apart shafts 50 (see FIG. 1) are shown at opposing ends of the conveyor mounted rotatably on bearing supports 51. The drive assembly for the delivery conveyor is not shown, but may be of any suitable type, such as a direct drive shaft off of a conventional motor assembly, or the sprocket and chain configuration described with respect to the feed conveyor system 18 in the mode of operation set forth below.

With reference to the frame 12, the frame is generally comprised of a top 60, a pair of spaced apart side supports 62 to which hydraulic or pneumatic cylinders 64 may be attached. Cylinders 64 are used to move the gripper assembly 14, described more thoroughly below and in the mode of operation, into and out of communication with the feed conveyor system 18 and delivery conveyor system 20.

Figure 3:
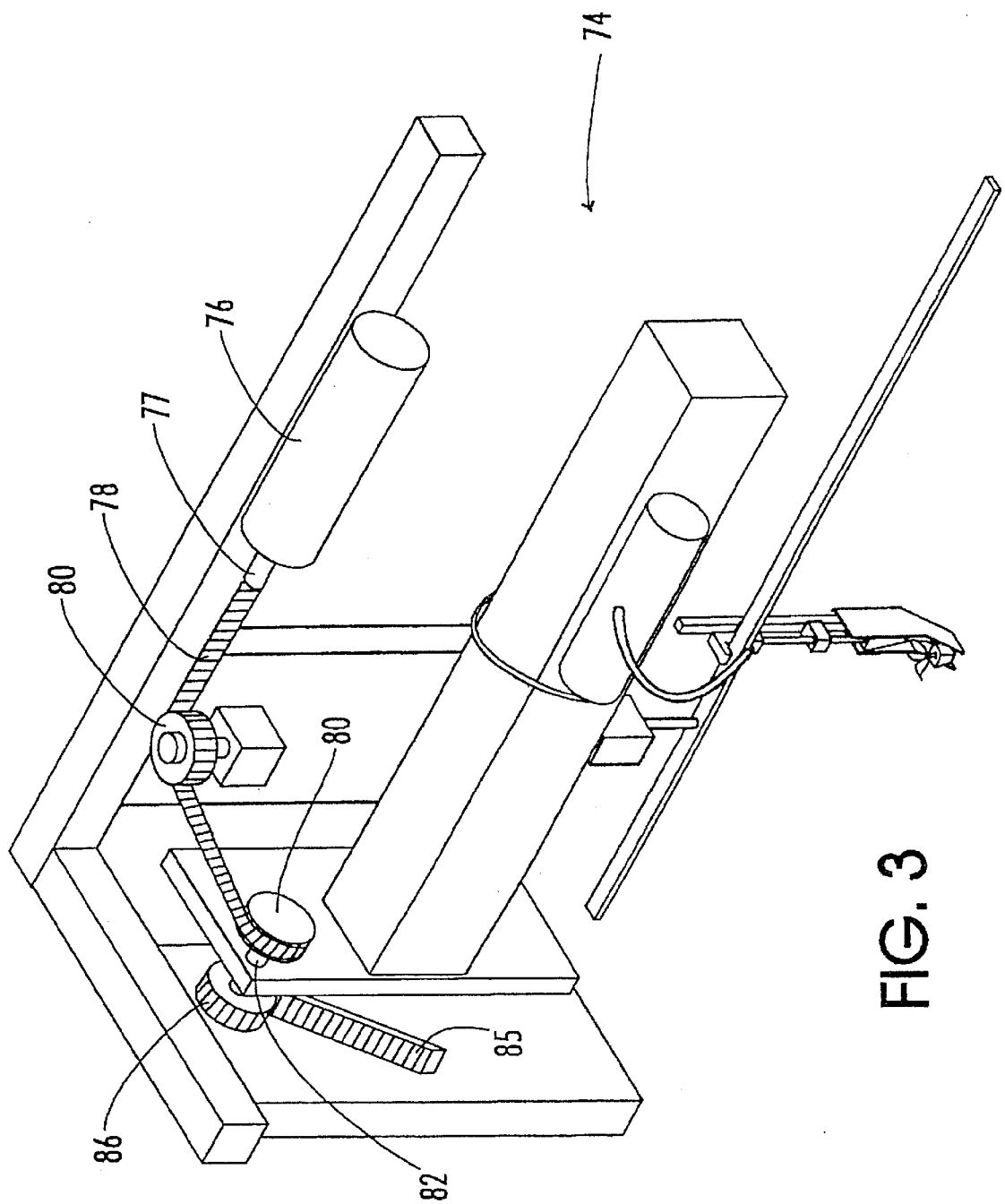
FIG. 3 is an elevated partially fragmented perspective view of an embodiment of the positioning assembly of the present invention.

The gripper assembly 14 is generally comprised of a gantry 70 resembling a sub-frame. A plurality of grippers 72 (shown as a collection in FIG. 1) are operably mounted to a rail system 73. Connection brackets 75 are used to move the collection of grippers 72 in directions away from a hypothetical axis drawn parallel and along the center of the feed conveyor system 18. The operable separation will be more thoroughly defined below. Gantry 70 is designed for lateral movement as well as vertical movement. Cylinders 64 are provided to move the gantry in lateral directions front to back of the frame 12, and positioning assembly designated generally by the reference numeral 74 (see FIGS. 3 and 4) is used to move the gantry of the gripper assembly along a decline which has a vertical and horizontal components of movement. The positioning assembly 74 is partially comprised of an actuating cylinder 76 having an actuating plunger 77 extending therefrom.

Chain 78 having spaced apart ends, one of which is attached to the reciprocating plunger 77 and the other of which is engages sprockets 80 mounted to the shaft 82, provides a direct interconnection between the shaft 82 and the actuating cylinder 76. The track 84 has a plurality of notches which resemble geared grooves 85. A gear 86 meshes with the gear grooves 85 (see FIG. 3). As will be further described below, when the actuating cylinder plunger 77 is reciprocated inward or outward from the actuating cylinder 76, the length of chain 78 is drawn toward the cylinder or allowed to move away from it. When the plunger 77 is pulled inward toward the actuating cylinder 76, gear 86 rolls in a generally upward direction on the inclined track 84 as it meshes with the gear grooves 85 of the track.

Similarly, when the chain is allowed to move away from the actuating cylinder, the gear 86 meshing with the gear grooves 85 of the track 84, rides down the incline of the track 84. In this fashion, the elevation of the grippers 72 can be altered during operation. With respect to the alteration of the elevation of the grippers, attention is directed to FIGS. 2, 8 and 9 wherein it is shown that the feed conveyor 18 is merely elevated slightly above the horizontal plane of the delivery conveyor 20.

With reference to FIGS. 5A–5C, 6A, 6B and 7 a gripper is designated generally by the reference numeral 88. Gripper 88 is generally comprised of a vertical support arm 90 attached to the brackets 75. Belt 93 is shown positioned within the spaced apart components of the brackets 75. The belt 93 is generally a continuous strand which interlaces each of the grippers 88 of the gripper assembly 14 (as best seen in FIG. 1 pertaining to the collection of grippers illustrated in that Figure). Apertures 94 of the bracket 75 are provided to inter-engage and slide along the rails 73 of the gantry 70 as best seen in FIG. 1.

A water tube 100 is positioned substantially parallel to the vertical arm 90 and is held in place in relative alignment therewith and attachment thereto with a plurality of collars 104. The collars have a central bore (not shown) in which the water tube can slide. The water tube has an inlet end 101 and an outlet 103. Positioned near the outlet end and attached to the water tube 100 is a plunger like separator 106 (or as will be described below as an air bladder).

The separator 106 has at least one beveled surface 105 and is positioned between the gripper fingers 107 which are positioned in spaced apart pivoting relationship to one another. Pivot 109 enables the gripper fingers to open and close in a pinching fashion on the arm 90. Angle 110 or denoted by the greek symbol alpha, is preferably 30 degrees. A similar angle of 30 degrees, or 60 from the horizontal, corresponds with the angle of the track 84 of FIG. 4. The preferred angle alpha of the gripper fingers or angle alpha of gripper presentation has been selected to correspond with the operation of the device which will be more thoroughly described hereinbelow.

In use, the gripper fingers 107 are separated by a downward movement of the water tube 100 in response to the plunger separator 106 passing between the spaced apart gripper fingers 107. In this fashion, the plunger separator has an inclined surface so that insertion of the plunger separator 106 forces the gripper fingers 107 apart and when extracted therefrom the biased pivot 109 enables the gripper fingers to flex back toward one another and create a pinching action. Thus, when the gripper fingers surround a seedling plug (as best seen in FIG. 8), the distal end 111 of the gripper fingers 107 surround the seedling plug 108. When the water tube is extracted, thereby removing the plunger 106 from between the gripper fingers 107, the gripper fingers pinch the plug in such a manner as to take possession of the plug seedling 108. Of course it is also contemplated that the gripper fingers may have a angled portion and the plunger may be symmetrical and lacking a beveled surface in order to accomplish the same function.

Figure 4:
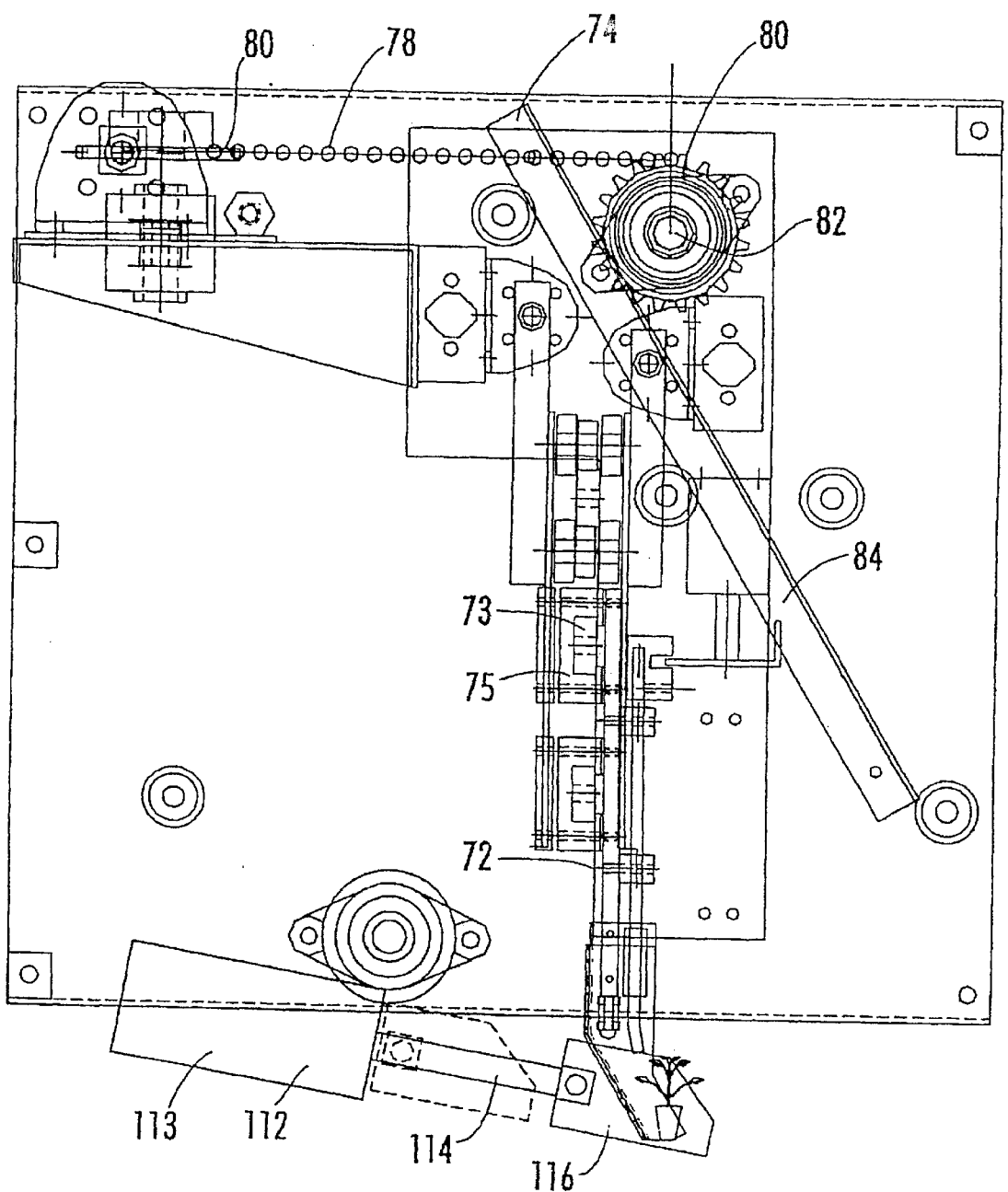
FIG. 4 is an enlarged plan view of an embodiment of a gripper assembly and positioning assembly, illustrating their interrelationship of the preferred embodiment of the present invention.
Figure 5A:
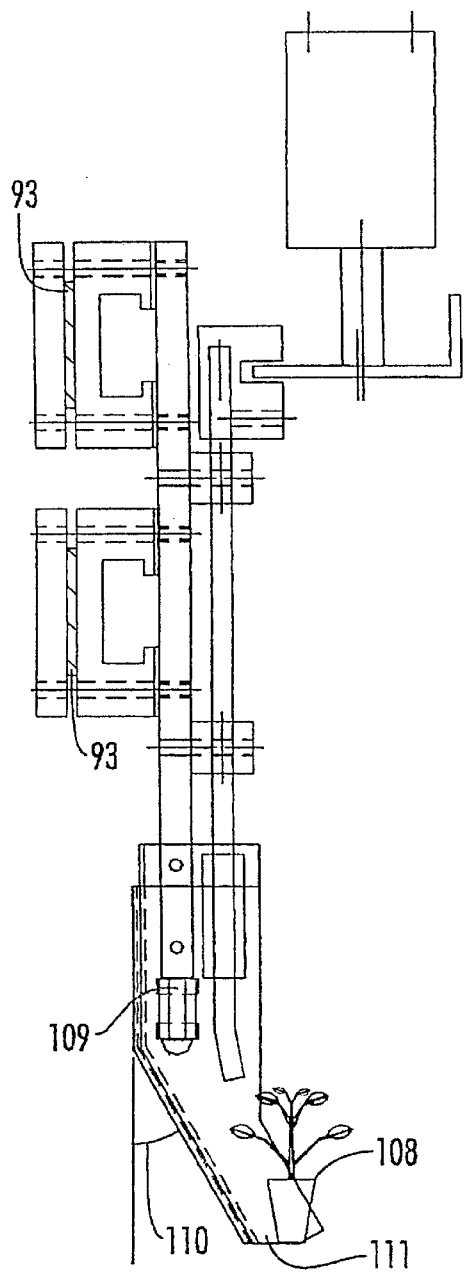
FIG. 5A–5C are side, front and back views, respectively, of a gripper element of the present invention.
Figure 5B:
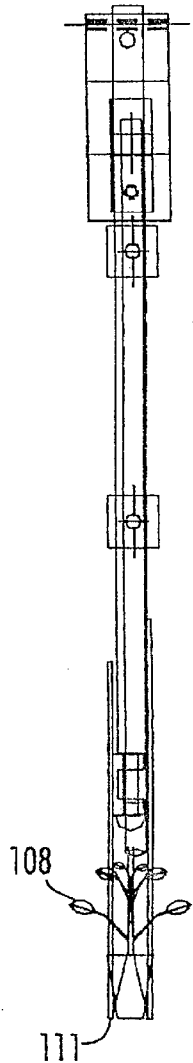
Figure 5C:
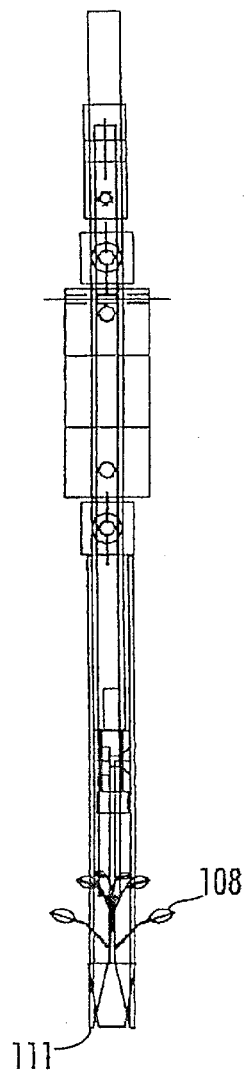

With reference to FIG. 4, an optional cleaning mechanism 112 is comprised of a reciprocating cylinder 113 having a shaft 114 which is reciprocal from an inward and outward position with respect to the cylinder 113. Hence, the free end of the shaft 114 has a cleaning plate 116 attached thereto. The cleaning plate is provided to scrape away any clinging soil or debris from the gripper fingers 107 after insertion of the seedling plug into the delivery tray 118 during each successive cycle of the machine. With reference to FIGS. 8 and 9, as well as the figures previously described, the mode of operation will be set forth below.

Figure 10:
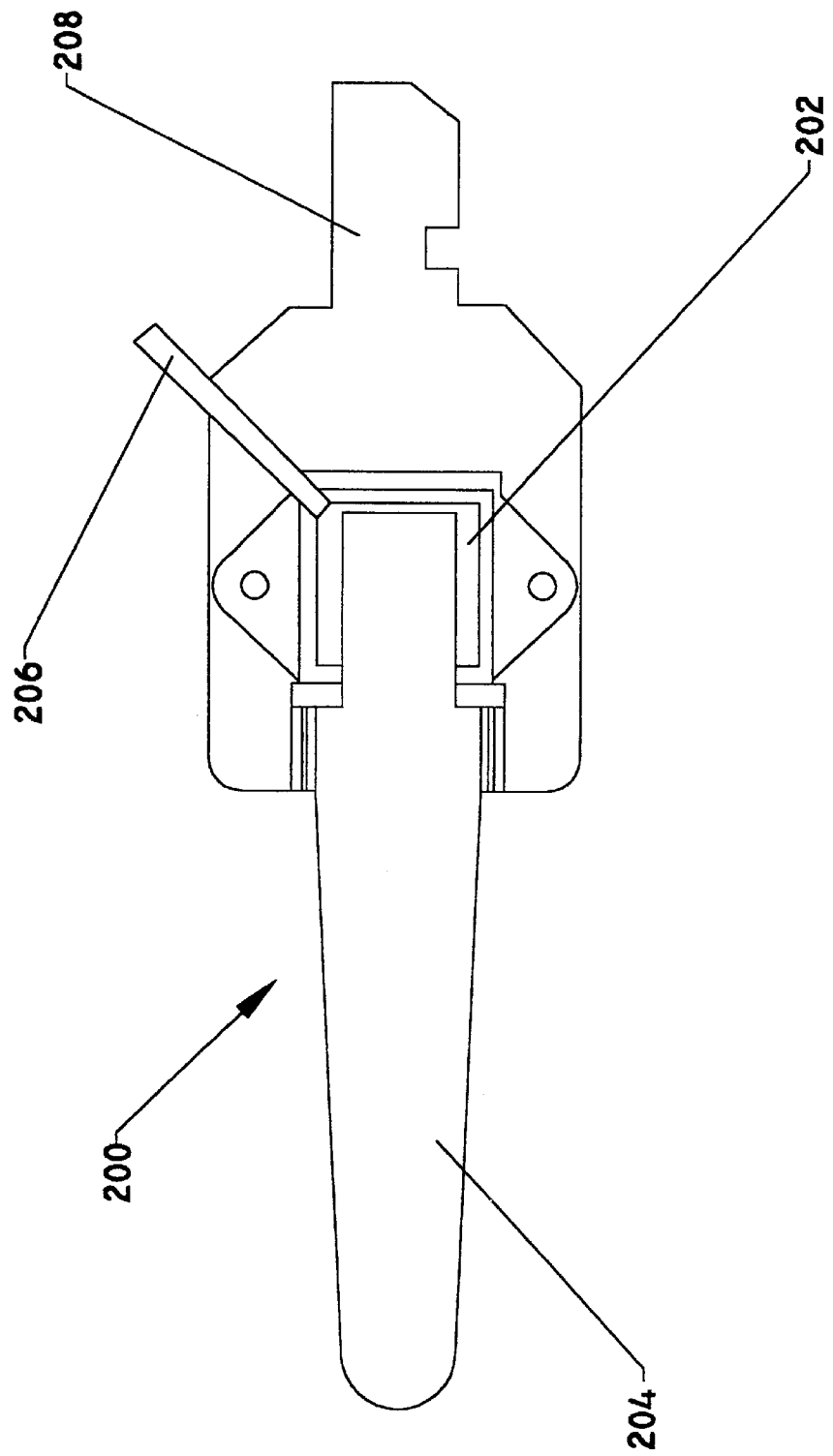
FIG. 10 is a side view of an alternate embodiment of a gripper component of the present invention.
Figure 11:
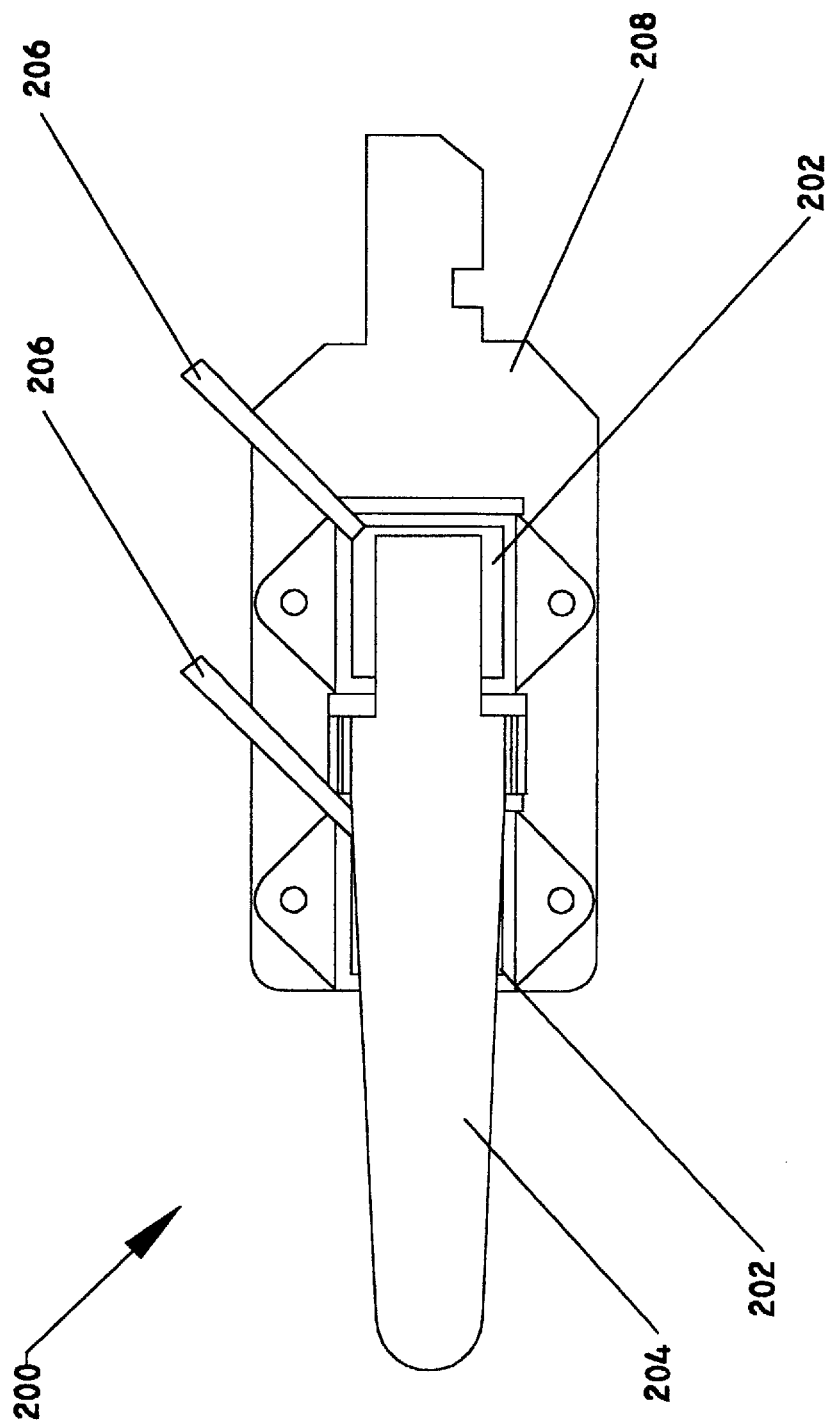
FIG. 11 is a side view of an alternate embodiment of a gripper component of the present invention.

With reference to FIGS. 10 and 11, an alternate embodiment of the gripper portion of the present invention is designated generally by the reference numeral 200. FIG. 10 shows a single bladder pneumatic gripper and FIG. 11 shows a double bladder gripper, which means that a single air bladder 202 or a plurality air bladders 202 may be used to selectively and operably open and close the finger portions 204 of the gripper 200.

Inlet tube 206 provides suitable structure by which air or some other suitable working fluid may be introduced into or removed from the air bladder 202. The configuration of the base plate 208 is largely non-critical so long as it enables the gripper components such as the air bladder(s) 202 and fingers 204 to be operably mounted or attached thereto in a manner sufficient to allow them to perform any of their intended functions.

Figure 6A:
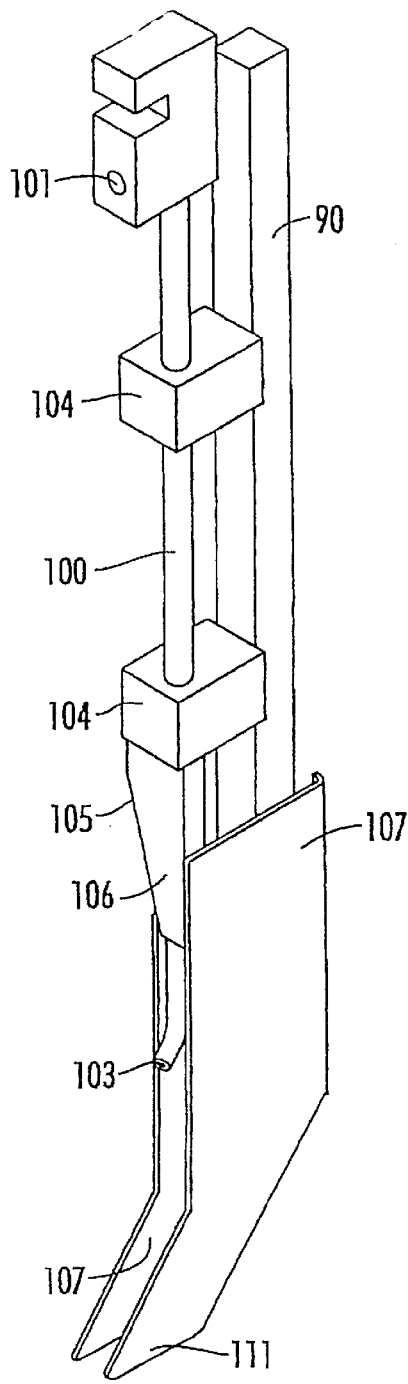
FIG. 6A and 6B are elevated perspective views of an embodiment of a gripper of the present invention.
Figure 6B:
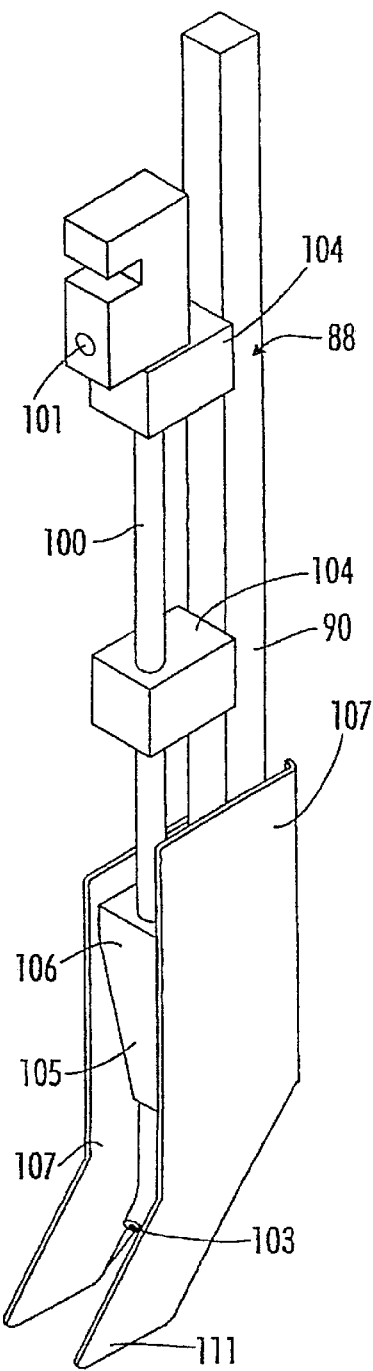
Figure 7:
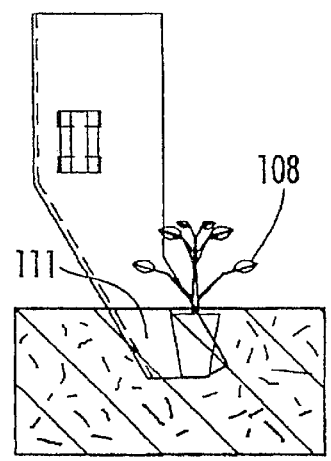
FIG. 7 is an enlarged fragmentary plan view of the gripper fingers of the grippers shown in FIGS. 5A–5C, and 6A–6B.
Figure 12:
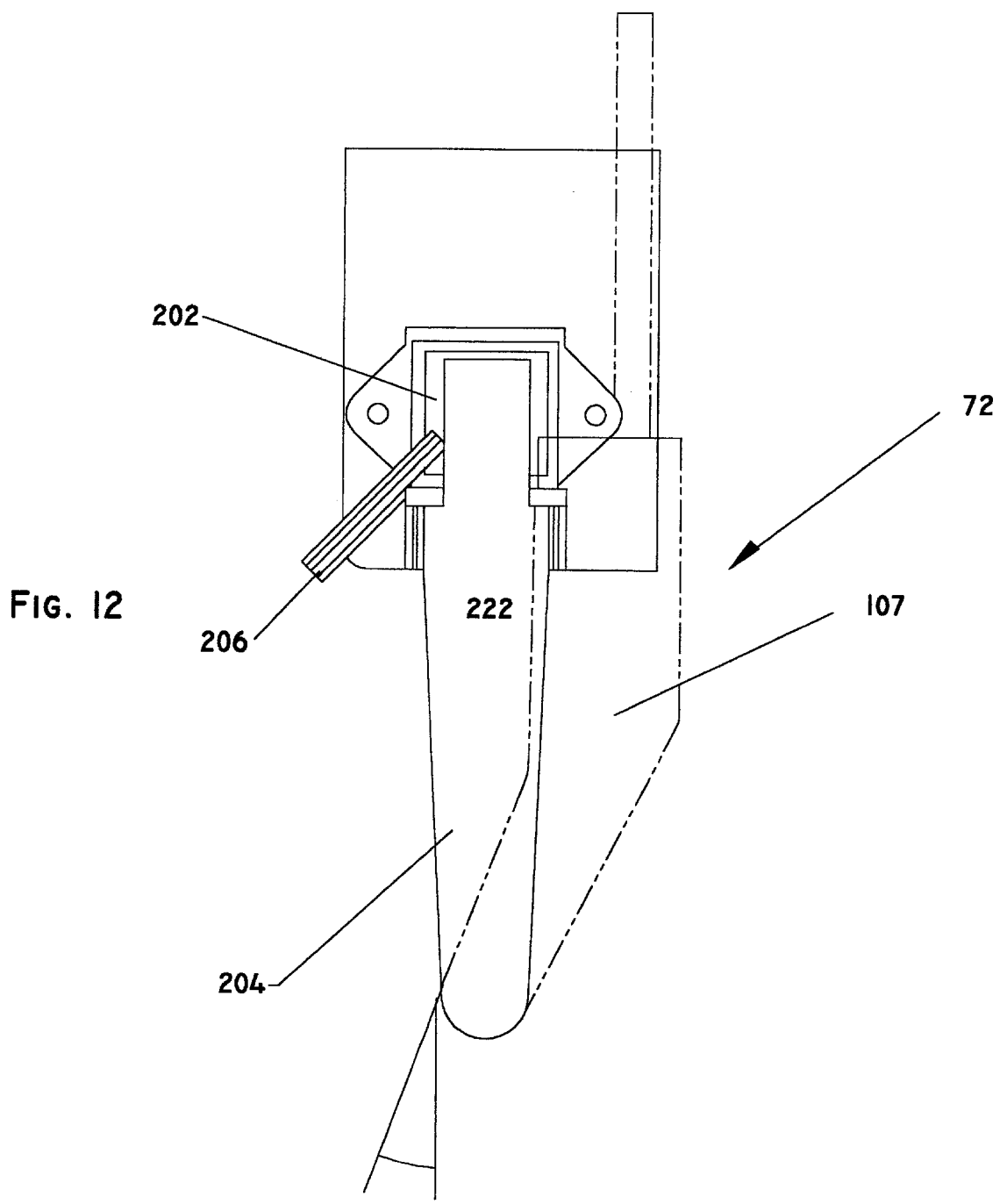
FIG. 12 is a side of the gripper shown in FIG. 10 with the gripper of FIG. 5A superimposed thereon and shown in dashed lines for comparison.
Figure 13:
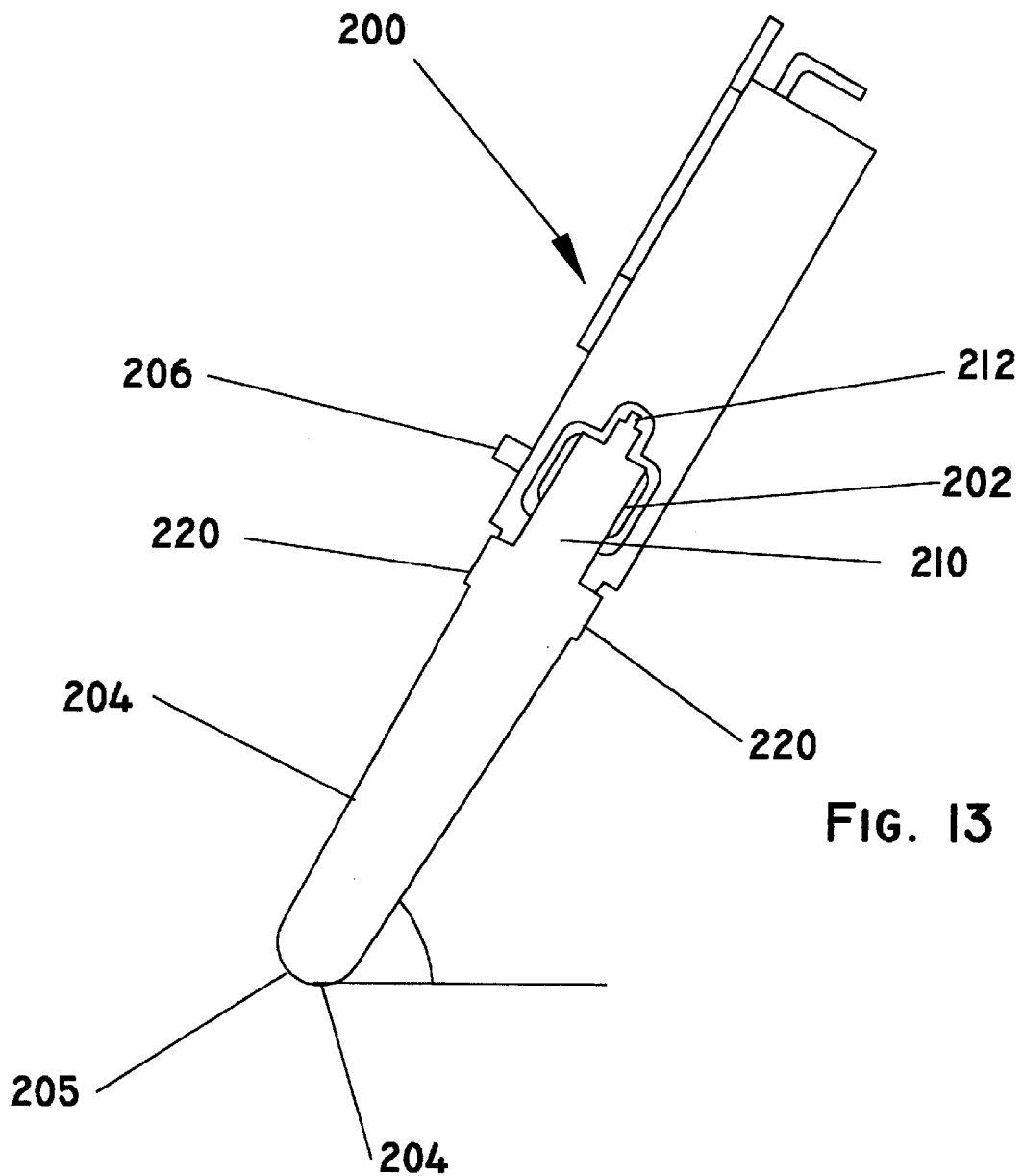
FIG. 13 is a side view of the gripper component shown in FIG. 10 and situated at a preferred operating angle alpha similar to that shown in FIG. 12.

With reference to FIGS. 12 and 13, gripper 200 (FIG. 10) is shown in relative vertical alignment with another embodiment of the gripper of FIGS. 6A and 6B as depicted by the dashed lines of FIG. 12. The dashed lines serve to point out the linear nature of the finger portions 204 of the gripper 200. As described above and herein below, the preferred embodiment of the apparatus includes a gripper assembly having gripper fingers 107 or 204 that approach the seedling to be transplanted at an angle. The vertical nature of the gripper show in FIG. 6A and 6B provides this angular line of attack by providing an angled finger portion 107, whereas the alternate embodiment is preferably rotated to an angle alpha (FIGS. 12 and 13) to provide an angle sufficient for transplanting operations.

Figure 14:
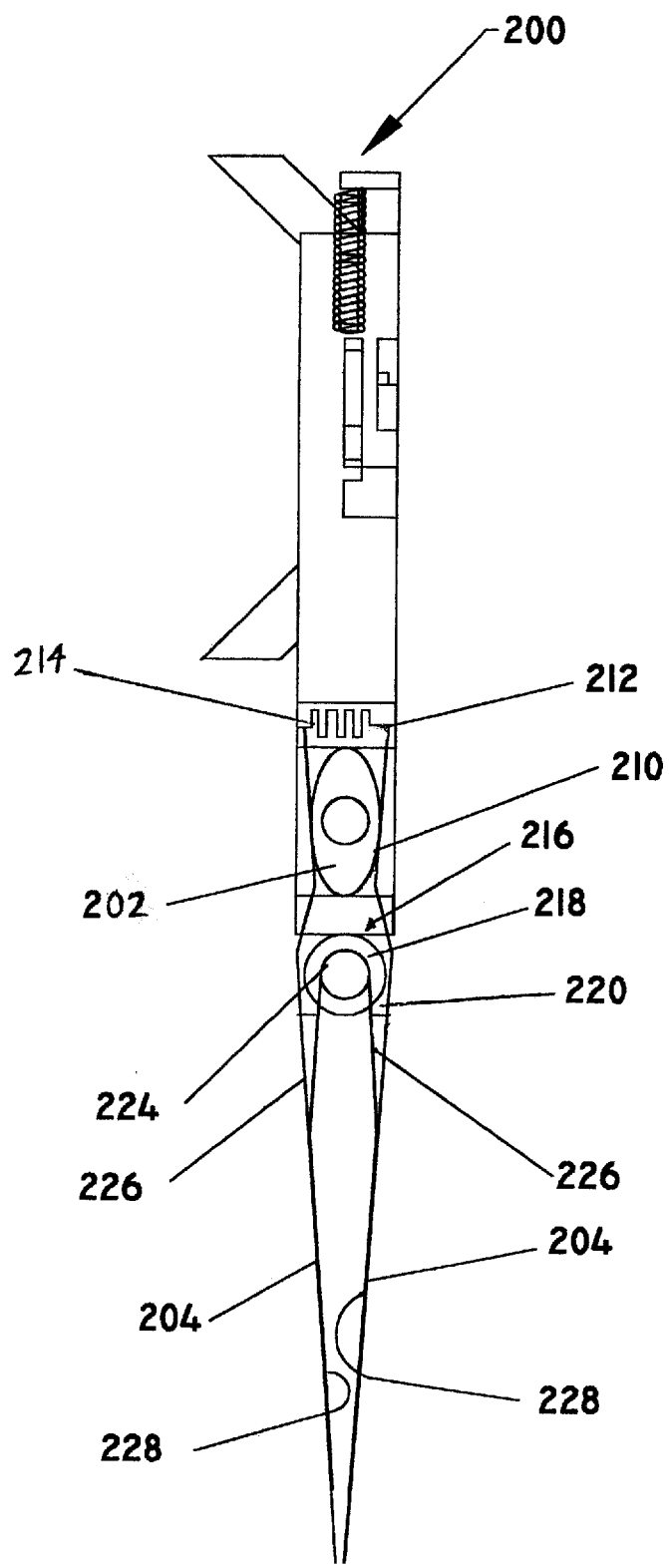
FIG. 14 is a front view of the gripper of FIG. 10 shown with the finger portions in a closed position and the air bladder inflated.
Figure 15:
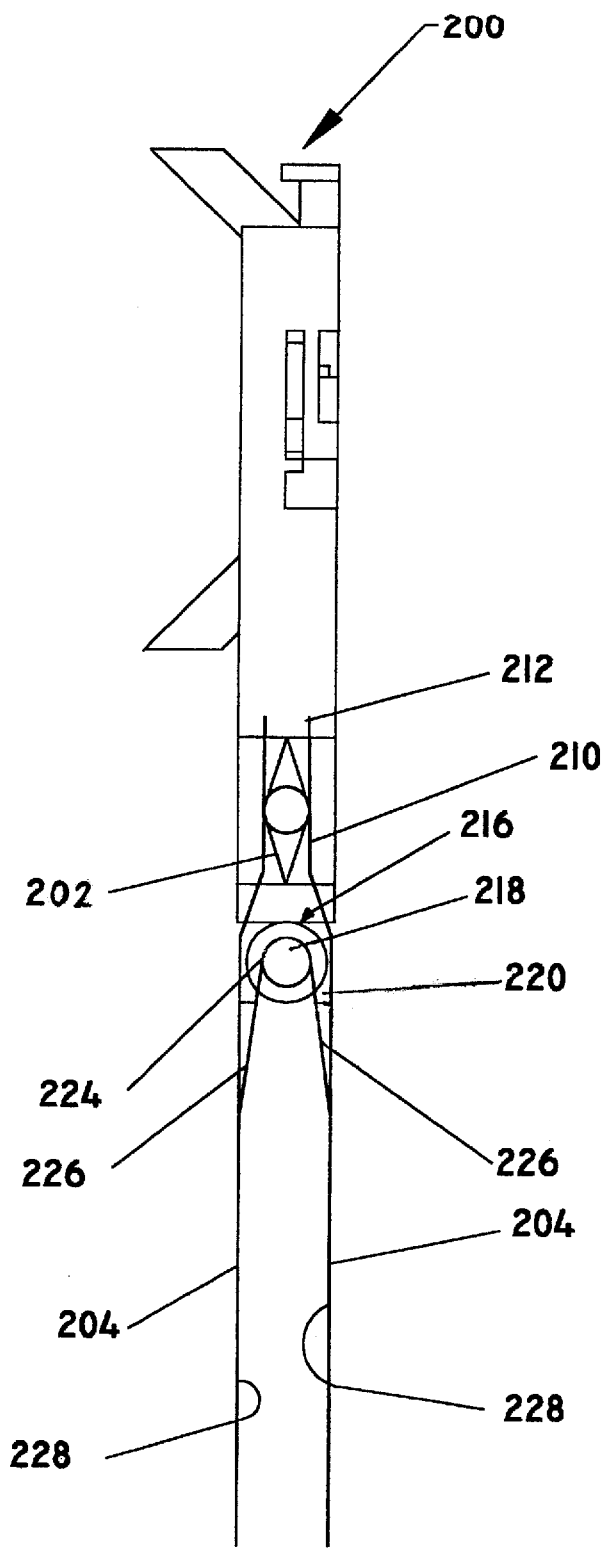
FIG. 15 is a front view of the gripper of FIG. 10 shown with the finger portions in an open position and the air bladder deflated.

With reference to FIGS. 13–15, fingers 204 of the gripper 200 preferably include an arcuate distal end 205, a flanged proximal end 210 having a post 212 extending therefrom. Post 212 enables a coil spring (not shown), or other suitable biasing member, to bias the proximal portions 210 of the fingers 204 toward one another in the rest position when the air bladder 202 is deflated and the fingers 204 are open FIG. 15). Similarly, when the air bladder 202 is inflated, the biasing member in the form of a spring is stretched allowing the proximal ends 210 and posts 212 to separate and the fingers 204 to close (FIG. 14).

Axle assembly 216 is provided to enable the distal end 205 of the fingers 204 to selectively and operably move between an open and closed position while the proximal portion 210 of the fingers 204 moves in the opposite manner (i.e., closed or toward one another and open or away from one another). The axle assembly 216 is held in position between the fingers 204 by a pin 218 which passes through the ears 220 extending from and substantially perpendicular to the planar surface 222 of the fingers 204. The pin 218, therefore, passes through the left or right side ears 220 of the fingers 204 and back through the opposing pair of right or left side ears 220 respectively of the fingers 204. In an alternate embodiment of the invention, post 212 and a coil spring 214 (FIG. 14) may be eliminated (FIG. 15) or supplement an alternate biasing member in the nature of a leaf spring 224 having leaves 226 extending therefrom (FIG. 14).

The leaf spring 224 has a central diameter associated with its solid cylinder height that is sufficiently large to enable the pin 218 to pass therethrough. The leaves 226 extend from the leaf portion of the spring 224 and bear against the inside surface 228 of the fingers 204.

MODE OF OPERATION

The preferred embodiment of the present invention designated generally by the reference numeral 10 is particularly useful in transplanting seedlings 46 from a plug tray 47 to a delivery tray 118. The preferred embodiment of the invention is particularly useful when the seedlings are begonias. Begonias have leafy foliage on short stems, thus making their handling by mechanized equipment delicate to prevent damage to the seedling during transplanting.

When the system is actuated, a seedling tray 47 is placed on the seedling feed conveyor system 22 between spaced apart separator bars 24. The feed conveyor system 22 shuttles the entire seedling tray 47 into alignment with a plate 51 having a row of holes 53 positioned therein. Considering that the seedling tray has drain holes in the bottom of the tray associated with each compartment for each individual seedling plug, the holes in the seedling tray align with the holes in the plate. When the holes in the tray and the holes in the plate are aligned through the shuttling action of the feed conveyor system 22, a plurality of vertical pins 55 (FIG. 8) rise up through the holes in the plates through the holes in the tray and raise the seedling plug 46 from its compartment. An entire row of seedlings is raised at one time. When in the raised position, the seedling plugs rest atop the pins. In this position, the gripper assembly gantry 70 is driven forward by the actuating cylinder 64. When in the forward position, the plunger 106 is pressed downward to open the gripper fingers 107.

As the gripper fingers 107 open in response to the plunger 106 or fingers 204 in response to the air bladder 202, they are moved around adjacent sides of the seedling plug 108 in a lateral manner so as not to damage the leaves which are often fragile (e.g., begonias). The lateral movement of the grippers 88 and the lateral grasping action of the gripper fingers 107 or 204 prevents damage to the seedling. In addition, the angle alpha of the gripper fingers 107, or of presentation of the gripper fingers 204, enables the gripper fingers 107 or 204 to grasp the seedling plug at its root ball as opposed to its green foliage.

When the gripper fingers are on adjacent sides of the seedling plug, the separating member or plunger 106 is extracted allowing the gripper fingers 107 to pinch closed, or the separating member or air bladder 202 to inflate allowing the gripper fingers 204 to pinch closed, and take possession of the individual seedlings.

After the gripper fingers 107 or 204 take possession of the seedlings, the gripper finger gantry is reciprocated rearward by the cylinders 64 into their transplanting position. After the gantry 70 is moved to its rearward transplanting position, the individual grippers 88 are extended laterally along the guide 73. The separation of each individual gripper is predetermined by the operator and the manner in which the operator adjusts the connection of the link belt 93 attached to each gripper 88. That is, the gripper fingers 107 or 204 are separated and contracted as a unit in an accordion like fashion. When separated, the positioning assembly allows the gantry 70 to travel down the inclined track 74 through the interrelationship of the gears 85 and 86 which is caused by allowing the actuating cylinder 76 to release the plunger 77 and, therefore, allow the length of chain 78 to travel in a direction outward from the plunger 77. As the chain 78 is released, the gripper fingers 107 or 204 then pierce the soil at an angle "alpha", either due to the angled fingers or the angle of presentation, of the delivery trays driving the seedling plug, after introduction of the tips of the gripper fingers 107 or 205, into the soil and thereby transplant them.

At the point and time when the gripper fingers have inserted the seedling 46 into the soil of the delivery trays, a jet or spray of water is dispensed through the water tube 100 of each individual gripper 88. The jet or spray of water is directed to impinge upon the root ball of the seedling plug and, therefore, help dispense it and release possession of it from the gripper fingers 107 or 204. The jet of water is also believed to promote immediate assimilation of the newly transplanted seedling into the delivery trays as the water causes the soil of the seedling plug to coalesce with the soil in the delivery tray.

Once the insertion and the injection of the jet of water is accomplished, the grippers 84 and 200 are extracted from the soil of the seedling delivery tray by the track 85 and gear 86 relationship described for the insertion except in the reverse process. When this is complete and the grippers are extracted, they combine in a condensing accordion like fashion and an optional cleaning mechanism 112 engages the gripper fingers. The cleaning mechanism plates 116 scrape the remaining soil and debris from the ends of the gripper fingers 107 or 204 so as to provide a substantially clean gripper finger 107 or 204 ready for the next cycle of transplanting.

The process is continued and repeated until the seedlings feed tray 47 is empty. When the seedling feed tray 47 is empty, it is shuttled toward the trap door 36 which opens and allows the empty tray to fall beneath the seed conveyor, at which time the next seedling tray is shuttled into position to restart the entire process.

These and other embodiments of the present invention shall become apparent after consideration of the scope of the enclosed specification and drawings. All such alternate embodiments and equivalents are deemed to be part of the present invention whose only limitation is the scope of the appended claims.

What is claimed is:

1. An automated apparatus for transplanting seedlings from a first tray to a second tray, the apparatus having a frame, a conveyor system to shuttle the trays of seedlings, and a gripper, wherein the gripper comprises:

a plurality of spaced apart finger elements wherein at least one of the finger elements is pivotally connected with respect to another finger element;

each finger element has a soil penetrating portion configured to enable a seedling to be transplanted into soil without the need for pre-dibbling the soil;

a separating member configured to enable the at least one finger element to pivot from a first open position and a second position during operation of the apparatus; and the separating member includes an inflatable bladder.

2. The gripper of claim 1, wherein the separating member further partially comprises:

fluid supply means for selectively inflating or deflating the bladder.

3. The gripper of claim 1, wherein the separating member is:

a reciprocating plunger.

4. A gripper configured for use with an automated seedling transplanting apparatus for transplanting seedlings from a first tray to a second tray and having an attachment mechanism for the gripper, wherein the gripper comprises:

a support portion configured to enable the gripper to be attached to the attachment mechanism of the transplanting apparatus;

at least two finger elements wherein at least one of the finger elements is pivotally connected to the support portion;

each finger element has a soil penetrating portion configured to enable a seedling to be transplanted into a soil filled tray;

a separating member configured to enable the at least one finger element to pivot from a first open position and a second position during operation of the apparatus; and the separating member includes an inflatable bladder.

5. The gripper of claim 4, wherein the separating member further partially comprises:

air supply means for selectively inflating or deflating the bladder.

6. The gripper of claim 4, wherein the separating member is:

a reciprocating plunger.

7. A seedling gripper apparatus useful for transplanting seedlings from a first location to a second location, the gripper comprises:

at least one finger element pivotal with respect to a support portion to which it is attached; and an inflatable bladder configured to enable the at least one finger element to pivot between a first position and a second position during use.

8. The gripper of claim 7, wherein the inflatable bladder further comprises:

a single bladder.

9. The gripper of claim 8, wherein the inflatable bladder further comprises:

an inlet tube to enable a working fluid to be introduced into and removed from the bladder.

10. The gripper of claim 9, wherein:

the inlet tube extends from the bladder through the support portion to the exterior of the support portion.

11. The gripper of claim 7, wherein the at least one finger element further comprises:

a plurality of finger elements; and at least one of the plurality of finger elements is pivotal with respect to any other of the plurality of finger elements.

12. The gripper of claim 11, wherein the inflatable bladder further comprises:

an inlet tube to enable a working fluid to be introduced into and removed from the bladder.

13. The gripper of claim 12, wherein:

the inlet tube extends from the bladder through the support portion to the exterior of the support portion.

14. The gripper of claim 7, wherein the inflatable bladder further comprises:

an inlet tube to enable a working fluid to be introduced into and removed from the bladder.

15. The gripper of claim 14, wherein:

the inlet tube extends from the bladder through the body to the exterior of the support portion.

16. The gripper of claim 7, wherein the at least one finger element further comprises:

a pair of spaced apart finger elements; and at least one of the pair of spaced apart finger elements is pivotal with respect to the other.

* * * * *